Jan. 31, 1956 R. A. ZUERCHER 2,733,151
FOOD PACKAGE AND METHOD FOR THE PRODUCTION THEREOF
Filed Jan. 13, 1951 2 Sheets-Sheet 1
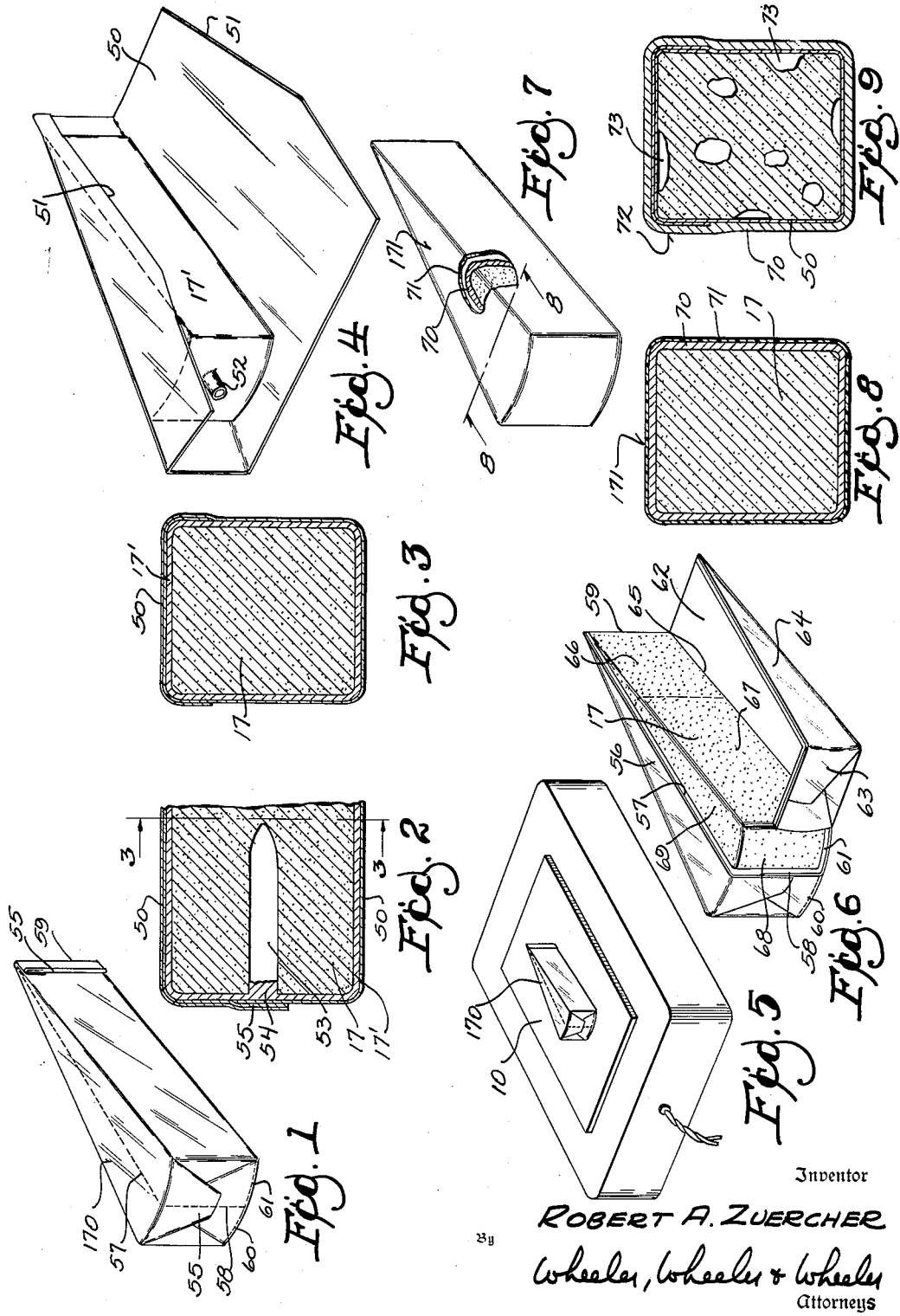
Inventor
ROBERT A. ZUERCHER
By
Wheeler, Wheeler & Wheeler
Attorneys Jan. 31, 1956 R. A. ZUERCHER 2,733,151
FOOD PACKAGE AND METHOD FOR THE PRODUCTION THEREOF
Filed Jan. 13, 1951 2 Sheets-Sheet 2
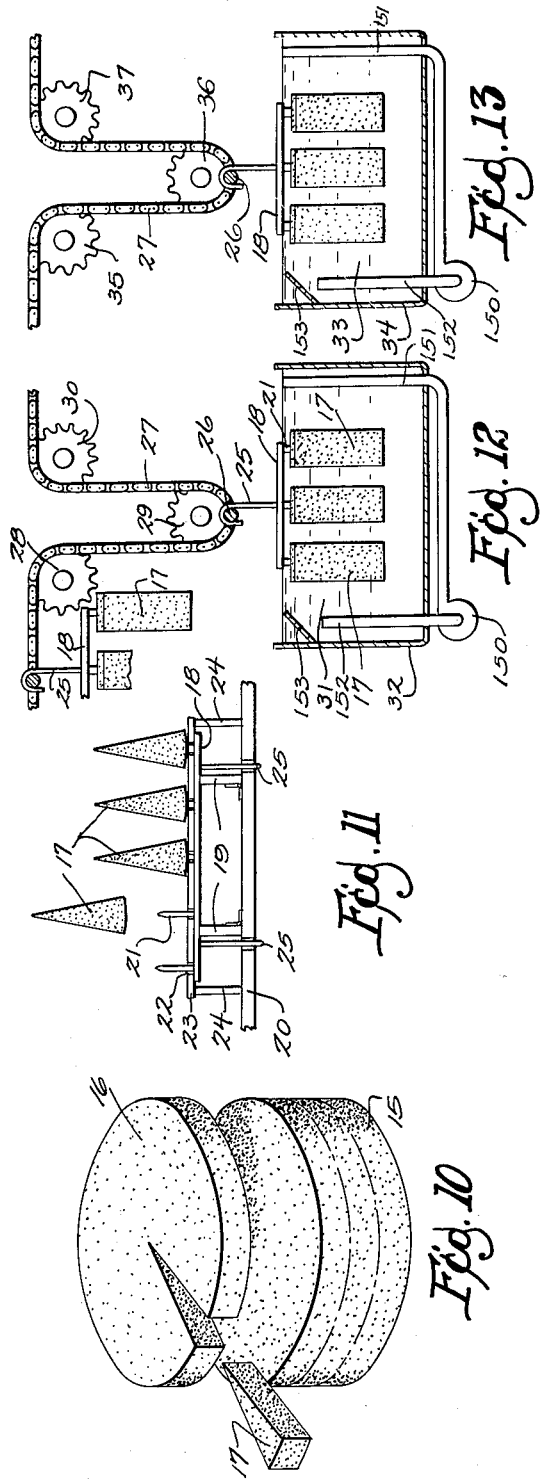
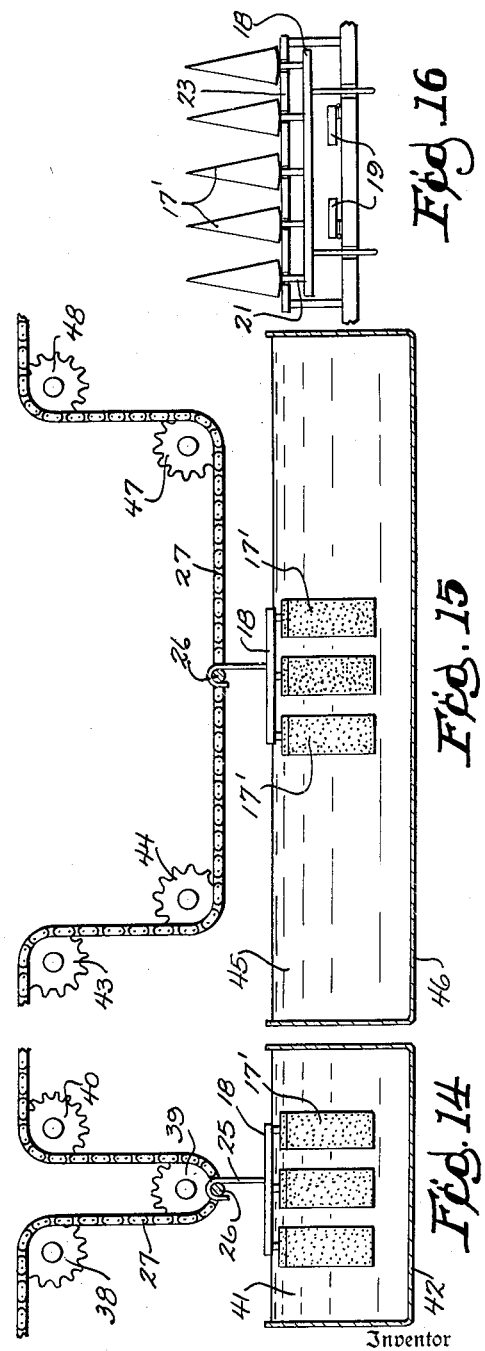
Inventor
ROBERT A. ZUERCHER
By Wheeler, Wheeler & Wheeler
Attorneys

United States Patent Office 2,733,151
Patented Jan. 31, 1956

2,733,151

FOOD PACKAGE AND METHOD FOR THE PRODUCTION THEREOF

Robert A. Zuercher, Park Ridge, Ill.

Application January 13, 1951, Serial No. 205,850

21 Claims. (Cl. 99—171)

This invention relates to a food package and method for production thereof.

The package product comprises a body of food (cheese being a good example) enclosed in a multi-ply envelope comprising a wrapper and a coating. The coating is desirably (but, from a generic standpoint, not necessarily) inside the wrapper. The coating is of a waxy nature and preferably comprises at least two layers, at least the first layer being made by dipping the food body into a molten bath. The coating not only encloses the product but also stiffens the walls of the composite envelope so that portions thereof may be opened and closed upon the body of food to expose such body for the removal of parts thereof for consumption, and to reconstitute the closure about such body for protection of the remainder during continued storage.

While the invention has generic aspects, as will hereinafter be explained, the specifically preferred package is one in which the cheese or other food product to be packaged is dipped (and desirably twice dipped) in a bath of heat-softened pressure sensitive and readily frangible wax coating material which adheres to the cheese or other body of food, but is adhered more strongly to the subsequently applied outer wrapper of cellulose acetate film or the like that supplies the tensile strength lacking in the coating material. Due to the fact that the adherence of the coating to the wrapper is greater than its adhesion to the cheese, it is possible to slit the multi-ply envelope thus formed and to fold downwardly one of its side walls, the flexibility of the wrapping film providing a hinge, thereby exposing the cheese for the removal of that portion thereof which is to be consumed. However, since the waxy coating remains pressure sensitive, it will re-adhere to the cheese when the wall portion of the envelope is folded back into position, thus reconstituting the package enclosure about the remaining cheese.

I may form the outer wrapper by dipping the previously coated food product in a plastic solution, instead of by wrapping it in a plastic web. Or, in the case of some products, such as Swiss cheese, where it is desirable to prevent the coating composition from filling the holes in the cheese, I may wrap the cheese first and then coat the wrapped product, leaving the coating compound on the exterior where it still seals the wrapper and supports side wall portions thereof for folding movement, for which the wrapper film provides tensile strength and constitutes a hinge.

The method by which the improved package is produced involves, in its preferred form, the dip-coating of the food product with a heated waxy coating material which is more adhesive to the subsequently applied wrapper than it is to the product, thereby to permit a portion of the resulting envelope to have hinge movement, the coating material being pressure-sensitively adherent to the food product when restored into contact therewith.

It is a feature of the method that the coating material is circulated in the bath in substantially the same direction and at substantially the same speed as the conveyor-propelled workpiece, to promote even deposits of the coating material on all surfaces of the workpiece, there being little, if any relative movement such as might cause heavier deposits on one face than another.

Stage cooling of the coating is desirable for many purposes to preclude cracking of the coating compound.

It is a further feature of the invention to control the thickness of the coating by controlling relative temperatures of the baths and the surface of the article to be coated.

A further phase of the method involves the impaling of the food product upon a peg by which it is suspended during the dipping operations, the impaled object or objects being thereafter stripped from the impaling peg and the deposits of coating material built up around the peg being used to close and seal the opening in the end of the product from which the peg has been withdrawn.

In the drawings:

Fig. 1 is a view in perspective of a packaged product embodying the invention.

Fig. 2 is a detail view fragmentarily illustrating the product of Fig. 1 in longitudinal section on an enlarged scale.

Fig. 3 is a view taken in cross-section on the line 3—3 of Fig. 2.

Fig. 4 is a detail view in perspective showing the product of Fig. 1 in the course of its being wrapped.

Fig. 5 is a view in perspective showing on a reduced scale the heat treatment of the wrapped package.

Fig. 6 is a view in perspective showing how a side wall portion of the composite envelope about the product may be opened up to expose the product.

Fig. 7 is a view similar to Fig. 1 showing a modified embodiment differing from that of Fig. 1 only in that the outer wrapper is made by dipping rather than applying a wrapping web.

Fig. 8 is a detail view on an enlarged scale taken in cross-section transversely through the product of Fig. 7 along the line 8—8.

Fig. 9 is a view in cross-section showing a further modified embodiment of the invention in which the wrapping film is in the inside and the coating on the outside thereof, about the product to be packaged.

Fig. 10 is a view in perspective showing initial steps in the preparation of the product for packaging.

Fig. 11 is a view in front elevation on a reduced scale showing segregated units of food material being impaled for dip coating.

Fig. 12, Fig. 13, Fig. 14, and Fig. 15 are views showing successive steps in the dip coating operation.

Fig. 16 is a view diagrammatically showing the stripping of the dip coated articles from the carrier pegs.

While various food products such as fruits, vegetables, meat products, and the like may advantageously be packaged in accordance with the present invention, I have selected the packaging of cheese as a means of exemplifying the invention, because the use of the invention in packaging cheese solves a number of problems of long-standing.

One of these problems concerns the keeping of the cheese without appreciable dehydration and without molding or other spoilage not only during the substantial periods of time required for merchandising, but also during the period after the cheese package is opened and before its contents are entirely consumed. For reasons indicated and to be covered in more detail hereinafter, the present invention solves these problems.

The invention is, of course, particularly concerned with the packaging of consumer size units. Cheeses, and particularly cheese of the cheddar and Swiss types, are ordinarily molded and cured in large wheels or daises such as that shown at 15 in Fig. 10. In order to cut consumer size blocks of cheese from the cylindrical body illustrated, and to accomplish this without waste, I prefer to cut the wheel into disks such as that shown at 16 and to divide each disk into segments 17 for packaging.

Every precaution is, for obvious reasons, taken to assure that the individual food units 17 to be packaged are free or substantially free of contamination of any kind. In accordance with the preferred practice of the present invention, a carrier 18 is supported on the collapsible hinged support members 19 which are hinged to a table surface 20. Projecting upwardly from the carrier 18 are pegs 21 upon which the food units 17 may be impaled, as shown in Fig. 11. The pegs 21 project upwardly through the slots 22 of a pallet 23 carried by supports 24 from the table. During the loading operation, the pallet 23 limits the extent to which the food units will move downwardly upon the impaling pegs on to which they are pressed.

When all the pegs of carrier 18 are loaded with food units 17, the carrier and its load of workpieces 17 is mounted by means of the carrier hook 25 upon the cross bar 26 which extends between companion conveyor chains, one of which is shown at 27. Cross reference is made to my companion application, Serial No. 205,849, filed January 13, 1951, and allowed April 7, 1954, entitled "Food Coating and Handling Apparatus.

In moving about the sprockets 28, 29, and 30, the chain causes the supporting bar 26 to follow a path so that each suspended carrier 18 and its load of food units 17 is dipped into a coating bath 31 in tank 32, as shown in Fig. 12. The coating material used is preferably waxy in character but has special characteristics including the following:

1. The wax must be molten at an appropriate temperature when the cheese is immersed therein.
2. It must be capable of adhesion to the cheese but should be capable of greater adhesion to a wrapping film.
3. It should remain pressure sensitive at ordinary temperatures, including temperatures of household refrigeration so that, at such temperatures, it may be re-adhered to a cheese surface from which it has been stripped.
4. At such temperatures the coating should be congealed to the point where it will support the otherwise flexible wrapping film and, desirably, it should break rather than bend when the wrapping film is bent sharply, whereby the ultimate jacket may be folded to and fro using the wrapping film as a hinge, the breaking of the coating permitting free hinged movement.

Quite a variety of coatings are suitable and the desired results may be controlled effectively by a variation in the selection of coating materials and by a variation of relative temperatures involved. Those skilled in the art will readily recognize the inter-dependence of these various factors and, accordingly, I shall disclose, for the purposes of the present specification merely by way of exemplification of the invention, the best materials, temperatures, and other data presently known to me for the practice of the invention.

The coating material which I have found particularly satisfactory for cheese comprises 100 parts by weight made up by combining two different compositions. The first composition comprises microcrystalline petroleum wax amounting to 80 parts of the total. Five-eighths comprises wax of 155° F. melting point and three-eighths comprises wax of 130° F. melting point.

The second composition, comprising 20 parts of the total, is a concentrate, one-fourth of which is the product known commercially as "Vistanex" (poly-isobutylene) of medium melting point and three-fourths fully refined paraffin having a melting point of 133° F. to 135° F.

Where the wax formula above set forth is employed, I maintain the first bath 31 thereof at a temperature of 175° F., and immerse the food units 17 in such bath for a period of about two seconds. It will be understood that the immersion can be effected manually as well as mechanically.

Liquid waxy coatings of this temperature seem to destroy any bacteria remaining on the surface of the cheese or other food products, thereby enhancing the keeping qualities of the product packaged in accordance with this method.

In order to produce the desired thickness of coating in the specified period of immersion in a bath of the specified analysis and temperature, I also control the temperature of the food units at the time of immersion, and I have found that an internal temperature of 52° F. is an appropriate temperature for the cheese. By referring to the internal temperature, I am taking into consideration the fact that the cheese, originally refrigerated in its entirety to about 52° F., may have had its surfaces raised to a somewhat higher temperature in the course of preparing the units for coating. It is desirable that the surface temperatures should be higher than 52° F. because a cold cheese surface will take an excessively thick coating of the waxy coating material. However, in practice, we have found that it is difficult to measure the surface temperature of the cheese but that a control of the internal temperature to about 52° F. will, in the course of routine handling, automatically yield a surface temperature which is correct.

After an interval which, in actual production, has been about thirteen seconds, the previously coated food product is dipped, as shown in Fig. 13, into a second coating bath 33 in container 34. The bath 33 may comprise a coating material of the same composition of the material above described, or if desired, a different composition can be used. For some purposes I have found it expedient to add color to the coating. The second coating bath 33 has, in actual production, used the same coating material maintained at a temperature of 168° F. and immersion lasts only about two seconds. Assuming that the carrier 18 is operated mechanically during this dipping operation, it may still remain on the cross bar 26 supported at one end by the same chain 27 above described. Sprockets at 35, 36, and 37 guide the chain to cause the bar 26 to lower and raise carrier 18 for the second dipping operation.

In both of the coating operations I have found it desirable that the portion of the bath in to which the articles are dipped in the course of their conveyor-propelled movement, shall be moving in substantially the direction of translative article movement, and at substantially the same average rate, since any pronounced relative movement between the bath and the articles will, if continued throughout the dipping period, result in heavier deposits of coating material on one face of the article than on the opposite face. Relative vertical movement cancels out, since it is partly in a downward direction and partly in an upward direction.

Similarly, the relatively slower translative movement which occurs as the article enters and leaves the bath tends to cancel out the relatively higher rate of movement which the article has when the chain is passing around the lower periphery of the pulley, the bath movement being in substantial correspondence with the average translative movement of the article.

The desired movement of the dipping bath may be effected in any way such, for example, as the circulation induced by the pump 150 which receives coating compound from the overflow pipe 151 in each of the tanks 32 and 34 and discharges the compound upwardly through pipe 152 in each tank. The baffle at 153 deflects and spreads the flow to cause the coating material to move across each tank from left to right in the direction in which the workpieces moves, so that there is little, if any, relative translative movement between the workpieces and the bath.

In the broader aspects of the method, with particular reference to the manner in which the workpieces are mounted, and the arrangement whereby the bath circulates in the same direction and at substantially the same rate in which the workpieces move, the precise nature or character of the articles which constitute the workpieces becomes unimportant.

Whether the coating is performed manually or mechanically, it is advantageous to congeal the coating by chilling it. This may be done after either or both of the dipping operations, but preferably follows the second dip as above described. The chain 27 passes about sprockets 38, 39, and 40 to lower and raise the carrier 18 for dipping the coated workpieces 17' into the cooling bath 41 in receptacle 42. This cooling bath may comprise water which, in actual production, is maintained at 72° F., immersion therein being for two seconds.

It is desirable that the cooling should not take place in one operation, since the coating material tends, if cooled too rapidly, to crack, thus destroying the otherwise perfect envelopment of the workpiece. Accordingly, the initial period of immersion is minimized and the workpiece is withdrawn and allowed a period of temperature equalization before the cooling is completed. In practice, I permit quite a substantial length of the chain 27 to intervene between the sprocket 40 and the sprocket 43 about which the chain passes downwardly to sprocket 44 to dip the workpiece 17' into the second cooling bath 45 in container 46. The workpieces have been allowed 28 seconds of temperature equalization before being dipped into the bath 45. This bath may also comprise water. In actual practice, I maintain this water at 62° F. and the period of immersion therein is about thirty seconds, the carrier 18 being withdrawn when the chain passes about sprocket 47 and moves upwardly to pass over sprocket 48. By thus conducting the cooling operation in stages with an intervening dwell, the coating is cooled without cracking. As many stages may be used as may be desired, but I have found two to be adequate for the particular coating above described.

The workpieces are now stripped from the pegs 21. This may be done, for example, by again inverting the carrier 18 beneath the slotted board 23 and dropping the hinged supports 19, as shown in Fig. 16, and pulling down on the carrier to strip the pegs from the coated food units 17' which are left on the pallet 23. Particular carrier and stripping mechanism is disclosed in more detail and is claimed in the companion application above referred to.

Fig. 4 shows the coated food unit 17' as it appears in the first stage of the wrapping operation, in which it is being enveloped in a web 50 of wrapping film such as cellulose acetate ("cellophane"), parchment, "Kraft Paper," glassine, dry wax sheets, rubber chloride films ("Pliofilm") or "Saran" or any other thin wrapping web. The wrapper is preferably cut to bevel its margins at 51, when the product has the wedge shaped form illustrated.

It will be noted that some of the coating material, originally deposited on the peg of the carrier, projects from the cheese in the form of a tube at 52 at the point from which the supporting peg has been withdrawn. There will be a hole at 53 in the food unit, as shown in Fig. 2, and as the operator proceeds with the wrapping operation beyond the point shown in Fig. 3, the operator will manipulate the still plastic tubular formation 52 of coating material to plug the hole 53, as shown at 54, the coating becoming continuous across the hole. The wrapping of the product thereupon proceeds in the same manner in which any package might be wrapped, and the lapping marginal portions 55 of the wrapping film may be heat sealed by pressing them against a heated surface or vice versa. In practice I have provided a form of hot plate 10, as shown in Fig. 5, and as the operator wraps each enrobed food unit, the various surfaces thereof are pressed against the heated surface of the plate 10 which not only heat seals the lapping portions of the wrapper but also softens the underlying waxy coating sufficiently to assure an intimate and complete bond between the coating and the wraping film. The resulting wrapped package is shown at 170 in Fig .1.

As aforesaid, it is an interesting characteristic of the coating compositions desirably used for the purpose of the present invention that these will never become completely hard but will remain "pressure sensitive" and, moreover, their adhesion to the wrapping film 50 exceeds their adhesion to the cheese. Consequently, although the coating was applied to the cheese in a manner to effect the complete enrobing thereof, any unwrapping operation which involves a withdrawal of the film from the wrapped product will draw the coating with the wrapper instead of leaving it adherent to such product.

No matter how the cheese or other product is unwrapped, this property is of advantage to the consumer. It is particularly desirable in the case of cheese, since one can make a cut through the composite envelope 56 (the envelope comprising both the coating and the wrapping film) along the longitudinal line 57, for example, thence vertically at 58 down the broad rear end of the package and at 59 down the forward apex thereof. From the cut at 58, the operator may cut laterally at 60 and 61 to the rear corners of the package along the lower margin thereof, as shown in Fig. 6.

This entirely frees wall portions 62, 63, and 64 of the envelope for outward movement, as shown in Fig. 6, the wall portion 62 hinging outwardly upon the uncut wrapper along the lower margin of the package at 65, while the coating breaks at this point to permit of the hinged movement.

Thereupon the user can move any desired section 66 of the food product, preferably from the smaller end or apex of the package (assuming the package to have the wedge shaped form illustrated) and when the wall sections 62, 63, and 64 swing upwardly upon the "hinge" 65, they will re-adhere themselves to the corresponding surfaces 67, 68, and 69 of the cheese or other food material and to abutting margins from which they were severed. Assuming that the re-adhesion is effected with reasonable promptness after a portion of the product is withdrawn, few, if any, organisms will have entered the package; and it has been found in practice that a package which has been opened and re-sealed in the manner described will remain free of mold or other deterioration for weeks under ordinary household refrigeration, thus giving ample time for the contents to be completely consumed.

For certain purposes, I may wrap the coated food product 17' by dipping it in a solution of film-forming plastic, made liquid either by heating or by the use of an evaporable solvent. Fig. 7 shows a wrapped product 171 in which the envelope comprises a coating ply 70 as already described, and a film 71 which is continuous about all surfaces thereof and made by dipipng as above described. The dipping is identical with the operations already described, and the film 71 differs from the coating 70 only in that it preferably comprises a plastic material such as a solution of cellulose acetate or the like, whereas the original coating 70 is desirably a softer but stiffer and thicker pressure sensitive material having the general characteristics above noted and desirably adherent more strongly to the film 71 than to the wrapped article 17.

For other purposes, the invention contemplates the fact that the wrapper may have its high tensile strength film 50 (or 71) inside of its coating of wax or the like at 70. The resulting envelope is designated by reference character 72 in Fig. 9. This construction is particularly useful where the cheese, meat, vegetable, or other food product has a highly irregular surface, Swiss cheese being an excellent example of a product which has large cavities such as those indicated at 73 opening to its outer surface. If the coating material were permitted to flow into these cavities, it would interfere with the consumption of the food product. Therefore, I may apply the wrapper 50 to the food product before the dipping operation whereby such product is coated. The coating is precluded by the wrapper 50 from entering into the cavity 73, but the coating still performs the function of completely sealing up the product. It also provides stiffness to the otherwise wholly flexible film of wrapping material 50 and thus has many of the advantages of the envelope previously described, despite the fact that it will not be re-adherent to the wrapped product, as is the case where the coating material is inside the wrapping film.

If the product shown in Fig. 7 is dip-coated in the manner above described, the withdrawal of the supporting pegs will leave an exposed tube of coating material like that shown at 52 in Fig. 4 which the operator will manipulate by hand to plug the wrapping film and the hole in the wrapped product, the coating remaining soft enough to seal upon itself when thus manipulated.

Having thus described my improved package and, by way of exemplification, the preferred formulation of coating employed and the preferred method of making the package,

I claim:

1. A food product package comprising a body of food enclosed in a form sustaining jacket which comprises a ply of flexible plastic wrapping film, and to which is adherent a wax coating ply compatible with said film and completely enclosing the product and bonded to the ply first mentioned and having sufficient substance to provide support for said film in substantially the shape of said jacket when the film is removed from support-receiving relationship to the body, the composite coating and film plies being readily cut for the partial severance of a portion thereof for hinged movement respecting another portion, and the flexibility of said film ply being sufficient to constitute a hinge upon which a partially severed portion of the composite plies can be moved, the coating ply being sufficiently frangible to permit such movement.

2. A package as defined in claim 1 in which the film ply intervenes between the food product and the coating ply.

3. A package as defined in claim 1 in which said coating comprises 80 parts of a composition of micro-crystalline petroleum wax and 20 parts of a concentrate consisting of poly-iso-butylene and paraffin.

4. A package as defined in claim 1 in which the coating ply intervenes between the film ply and the food product and is adherent both to the film ply and to the said product.

5. A package defined in claim 4 in which the adhesion of the coating ply to the film ply is greater than the adhesion of the coating ply to such product.

6. A package as defined in claim 5 in which the coating ply has a pressure sensitive surface re-adherent to the food product after being stripped therefrom.

7. A food package having a jacket comprising a ply of flexible plastic wrapping film of high tensile strength and a coating ply of low tensile strength wax compatible with the film and adherent to the wrapping ply, said wax coating ply being of sufficient substance to be form-sustaining in the shape of the package contents, cut lines and a hinge line marked on the jacket to define a hingeably movable section of the jacket whereby said package may be opened by pivoting said section about said hinge line when the jacket is severed on said cut lines and the coating ply is fractured on said hinge line.

8. The device of claim 7 in which the inner ply of said jacket is provided with a pressure sensitive surface re-adherent to the package contents upon closure of the hingeable section.

9. A cheese package comprising a body of cheese enclosed in a multi-ply wrap comprising wax and a film, the film and the wax being materially adherent whereby the wax and film plies are unitarily removed from the cheese body in unwrapping the cheese body.

10. A cheese package comprising a cheese body coated with a continuous layer of wax adherent to the cheese body and a wrapping film to which the wax coating is more adherent than to the cheese body whereby the wax coating is removed from the cheese body as the film is withdrawn.

11. An article of manufacture comprising, a preformed body of cheese covered over its entire area with an uninterrupted intimate coating of wax, the wax coated cheese body being snugly confined within a flexible outer wrapper sheet adhesively united with the underlying wax coating over its entire area, whereby the latter is adapted to be peeled from the cheese body upon withdrawal of the wrapper sheet.

12. A method of wrapping a food product, which method comprises dipping such product in a wax liquid bath of coating material adherent thereto and capable of greater adhesion to a wrapper, solidifying the coating to a form-sustaining consistency, subsequently enclosing the coated food product in a wrapper and adhering said wrapper to said coating by pressing it thereon, said wrapper being compatible with said wax coating material.

13. The method of claim 12 in which the application of the wrapper includes a heat treatment of the wrapper surface at a temperature sufficient to soften the solidified coating and promote the bonding of the coating and wrapper.

14. A coating method which comprises moving through a coating bath a body of food to be coated, and circulating the material of the bath in substantially the same direction and at substantially the speed of movement of the body of food, whereby to make the deposited coating substantially uniform in thickness.

15. A method of coating a body of food by dipping it in a molten bath of coating material, which method comprises lowering the body of food into the bath, moving it translatively within the bath, and raising the workpiece from the bath, while circulating the material of the bath in the direction and at substantially the average rate of translative movement, whereby to make the deposited coating substantially uniform in thickness.

16. A method of packaging a food product, which method comprises dipping the product in a molten waxy coating material, removing the product, and abruptly chilling the coating thereon in a succession of steps with intervening dwell to permit temperature equalization.

17. The method described in claim 16 in combination with the further step of subsequently wrapping the coated product with a heat-sealable web compatible with said wax after the coating has congealed and subjecting the wrapped product to heat and pressure to heat-seal the wrapper and adhere the wrapper to the coating.

18. A method of packaging a body of food, which method comprises impaling the body of food upon a peg, manipulating the body of food by means of the peg while dipping the impaled body of food in a molten coating bath, withdrawing the body of food by means of the peg from such bath, withdrawing the peg from the body of food while the coating material remains plastic, and plugging the hole in the body of food with coating material which has accumulated about the peg and from which the peg has been withdrawn.

19. A method of packaging cheese which comprises impaling the cheese upon a supported peg, supporting the cheese by such peg while dipping the cheese and a portion of the peg into a molten coating bath of waxy material adherent to the cheese and more adherent to a wrapping film, withdrawing the cheese from such bath by manipulation of the peg, withdrawing the peg from the cheese, plugging the hole in the cheese with coating material while such material is cohesive to complete the envelopment of the cheese, and subsequently wrapping the coated cheese in a plastic film compatible with said waxy material to which the coating material adheres to provide a bond between the cheese and such film.

20. The method of packaging a body of cheese, which comprises enclosing the cheese body in a multi-ply wrap comprising wax and a compatible plastic film to which the wax is adherent whereby the wax and film plies are unitarily removed from the cheese body in unwrapping the cheese body.

21. The method of packaging a body of cheese which comprises the steps of coating the cheese body with a continuous layer of wax adherent to the cheese body and applying to the wax coated cheese body a plastic wrapping film compatible with the wax and to which the wax coating is more adherent than to the cheese body whereby the wax coating is removed from the cheese body as the film is withdrawn.

References Cited in the file of this patent

UNITED STATES PATENTS

| | | |
|---|---|---|
| 1,925,443 | Gere | Sept. 5, 1933 |
| 2,009,033 | Levenson | July 23, 1935 |
| 2,102,516 | Coster | Dec. 14, 1937 |
| 2,187,734 | Ennis | Jan. 23, 1940 |
| 2,342,969 | Richardson et al. | Feb. 29, 1944 |
| 2,373,849 | Palmer | Apr. 17, 1945 |
| 2,388,984 | Mack | Nov. 13, 1945 |
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |

FOREIGN PATENTS

| | | |
|---|---|---|
| 480,565 | Great Britain | Feb. 24, 1938 |

OTHER REFERENCES

"The Chemistry and Technology of Waxes," 1947, by A. G. Worth, published by Reinhold Publishing Corp., 330 West 42nd St., New York 18, New York, pages 400 and 401.